(12) United States Patent
Reed (10) Patent No.: US 6,361,198 B1
(45) Date of Patent: Mar. 26, 2002

(54) INTERACTIVE LIGHT DISPLAY

(76) Inventor: Edward Reed, 924 Pinon Ct., Longmont, CO (US) 80501

( * ) Notice: Subject to any disclaimer, the term of this patent is extended or adjusted under 35 U.S.C. 154(b) by 0 days.

(21) Appl. No.: 09/365,265

(22) Filed: Jul. 31, 1999

Related U.S. Application Data (60) Provisional application No. 60/094,939, filed on Jul. 31, 1998.

(51) Int. Cl.⁷ .................................................. F21V 8/00
(52) U.S. Cl. ....................... 362/554; 362/123; 362/555; 362/568; 362/800
(58) Field of Search ................................ 362/554, 568, 362/123, 800, 555, 567; 428/19, 20

(56) References Cited

U.S. PATENT DOCUMENTS

| | | | | |
|---|---|---|---|---|
| 3,616,102 A | * | 10/1971 | Baus et al. ................. | 428/20 |
| 3,641,335 A | * | 2/1972 | Wall ........................... | 362/123 |
| 4,468,421 A | * | 8/1984 | Wang ......................... | 428/20 |
| 4,858,086 A | * | 8/1989 | Pietrantonio et al. ....... | 362/123 |
| 4,875,144 A | * | 10/1989 | Wainwright ................ | 362/554 |
| 5,213,407 A | * | 5/1993 | Eisenbraum ................ | 362/123 |
| 5,820,248 A | * | 10/1998 | Ferguson ................... | 362/123 |
| 6,056,427 A | * | 5/2000 | Kao ............................ | 362/568 |

FOREIGN PATENT DOCUMENTS

| | | | | |
|---|---|---|---|---|
| EP | 0290690 | * | 11/1988 | ................. 362/123 |

* cited by examiner

*Primary Examiner*—Sandra O'Shea
*Assistant Examiner*—Peggy A Neils

(57) ABSTRACT

An interactive light display includes multiple LED's selectively arranged to provide a light display, each of the LED's being capable of a plurality of activation states. Multiple fiber optic strands are also included, each strand having one end near one of the LED's and extending away from the LED to carry light outward from the LED. A computer is used for controlling the activation state of each of the LED's, allowing a wide variety of routines to be run with the display. Standard computer cable is used for connecting each of the LED's to the controlling computer, such that the activations states of all the LED's may be controlled to form selected light patterns. At least one one-way hinge may be positioned on each branch of the tree such that the distal portion of the branch is capable of hinging only upwards relative to the branch.

14 Claims, 11 Drawing Sheets

INTERACTIVE LIGHT DISPLAY

This application is a nonprovisional application claiming the benefit under 35 USC 119(e) of U.S. provisional application Ser. No. 60/094,939, filed on Jul. 31, 1998.

TECHNICAL FIELD

This invention relates to interactive light displays, and more particularly to computer-controlled holiday light displays including Christmas trees.

BACKGROUND ART

Holiday light displays, and especially those related to Christmas trees, are well known. "Live" trees with strings of colored incandescent bulbs have been used for many years. The resulting Christmas display is attractive, but is limited in its variation and is cumbersome to set up. The display also provides a hazardous mix of combustible trees with hot bulbs and extensive electrical wiring. Numerous attempts have been made to provide an artificial tree having a built-in light display, in order to find an efficient and safe replacement for the traditional live tree with added incandescent lighting.

The general solution has been to provide an incandescent light source in the base of an artificial tree, and to route the light from the source to the tree branches through fiber optic strands. Color may be provided by utilizing one or more colored light sources, by a rotating multi-colored light element, or by interchanging "programmable" colored discs.

Unfortunately, one or more shortcomings arise with all previously known devices. Most importantly, all of the devices utilize an incandescent light source. This requires a relatively large amount of electricity, and creates a risk of fire from electrical problems or from the heat generated by the bulbs. Additionally, because of the heat generated by the bulb, the light source typically must be located in the base of the tree for safety reasons. This in turn requires that the optical fibers be routed upward from the base of the tree through the trunk and outward to the individual branches, which causes certain disadvantages. First of all, there is often venting of the light housing required, which can result in a leakage of a significant amount of light prior to the light reaching the fiber optics. This loss of light detracts from the brightness of the display. Secondly, since each tree branch requires optical fiber run from the base to that branch, the more branches the tree has, the greater the diameter of its trunk must be. This results in an effective limit on the height and number of branches possible in the tree. Running optical fibers from the base to the tips of the tree branches also requires a great deal of optical fiber, as compared to the amount of optical fiber which would be required if local lights could be positioned on selected branches. Further, the number of possible variations of light patterns with conventional known light displays is limited by their use of rotating or programmable discs to vary the displayed colors and their sequence. Similarly, the number of colors available with conventional lighting is relatively limited.

DISCLOSURE OF THE INVENTION

In accordance with this invention, an interactive light display is provided which includes multiple LED's selectively arranged to provide a light display, each of the LED's being capable of a plurality of activation states. Multiple fiber optic strands are also included in the device, each strand having one end near one of the LED's and extending away from the LED to carry light outward from the LED. Any one of several means may be used for controlling the activation state of each of the LED's. For example, a purely mechanical switch may be used for simplicity and cost advantages. To better take advantage of the flexibility of the device, however, some microprocessor circuitry is most useful. The ideal controlling means would be a computer, which would allow an extremely wide variety of routines to be run with the display. Using a computer to control the display would allow routines to be conveniently custom-designed and easily exchanged, even allowing routines to be downloaded from the Internet or by modem transfer. Standard computer cable is typically used for connecting each of the LED's to the controlling means such that the activations states of all the LED's may be controlled to form selected light patterns.

One particularly useful application of the device is an interactive light display in the form of a Christmas tree having a trunk and branches extending laterally therefrom. The tree would typically have LED's located on or near each branch, with fiber optic strands extending outward from the LED's toward the ends of the branches. Optional vertebrate branches incorporating one-way hinges could be used to make the tree more easy to store or ship.

In view of the foregoing, several advantages of the present invention are readily apparent. An interactive light display is provided which is particularly adaptable for use in the form of a Christmas tree. The use of LED's in place of incandescent lighting makes the Christmas tree of the present invention considerably safer than known trees, due to the lower voltages and currents involved, and also due to the lack of heat associated with operation of LED's. Additionally, the colors of the LED's may be mixed to provide a palette of 256,000 potential colors, far exceeding any combinations of colors available with conventional light displays. For the same reason, there is no colored wheel commonly used in known devices, thus eliminating the maintenance and replacement costs associated with such wheels, as well as the motor required to operate them. Still another advantage of the Christmas tree of the present invention is that considerably less length of fiber optic strand is required as compared to a conventional tree of the same size. This is due to the capability of placing the LED's on or near the branches, which is possible because of the low heat emitted from the LED's. As an example, a 7.5 foot tree according to the present invention and utilizing LEDs on or near the branches would require approximately the same length of optical fiber as is currently used to construct a 3.5 foot tree using conventional incandescent lighting. Also, LED's are commonly rated at 100,000 hours of use, which is approximately ten times the life of a typical incandescent bulb. Finally, using a computer to control the display would allow routines to be conveniently custom-designed and easily exchanged, even allowing routines to be downloaded from the Internet. The variety of possible routines is limited primarily by the imagination of the user, and is incomparably greater than the limited variety possible with currently known devices.

Additional advantages of this invention will become apparent from the description which follows, taken in conjunction with the accompanying drawings.

BEST MODE FOR CARRYING OUT THE INVENTION

Figures 1, 3, 4:
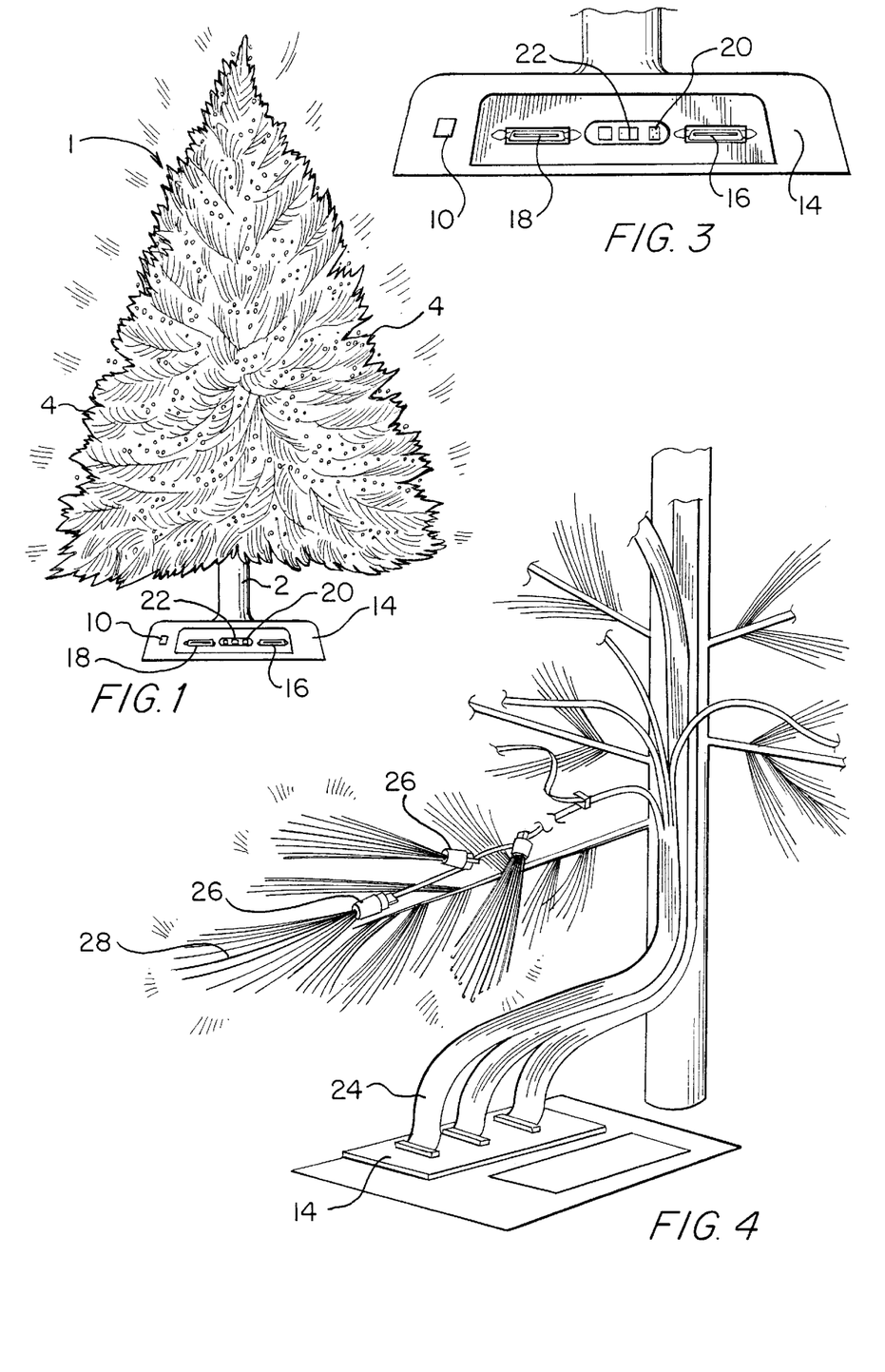
FIG. 1 is a perspective view of a Christmas tree light display of the present invention.
FIG. 3 is an isolated perspective view of the base of the tree, showing connecting ports and a membrane switch for toggling between routines.
FIG. 4 is a detailed view of a portion of the tree of FIG. 1, showing wiring, LED's and fiber optics.
Figure 2:
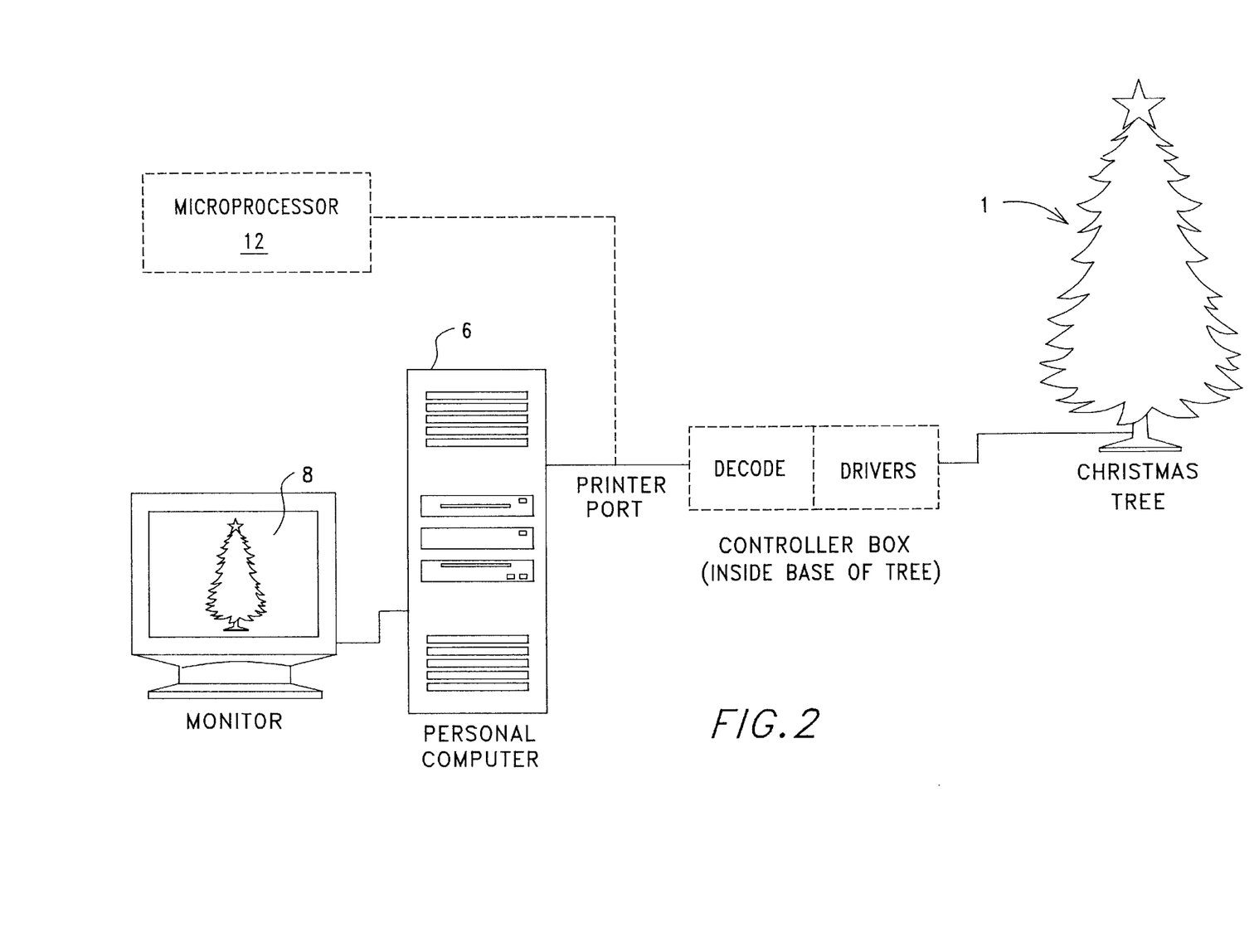
FIG. 2 is a schematic diagram showing the major components of an interactive display system of the invention.

Referring now to the drawings, FIGS. 1 and 2 show an interactive light display in the form of a Christmas tree 1. The tree 1 has trunk 2 and branches 4 extending laterally outward from the trunk 2. As may best be seen in FIG. 2, the interactive display may optimally be controlled by a computer 6, with a monitor 8 for viewing the controlling process. Simpler methods of control are optional, such as a purely mechanical switch 10, or microprocessor circuitry 12 capable of generating several varieties of light display patterns, but without the flexibility of a computer. These simple options could be used to provide simplicity of operation of the device at lower cost. The base 14 of the tree includes optional computer connection ports 16 and 18 to allow the tree to connect to the computer 6. A power entry port 20 is provided for mating to a standard IEFC power cord. Optional membrane switch 22 allows the user to toggle between routines which provide various patterns of light displays.

Referring now to FIGS. 3–6, the wiring and positioning of lights on the tree 1 may be seen. Standard computer cable 24 extends from the base 14 up the trunk 2 and to LED's 26 positioned on the branches 4 of the tree. Bunches of fiber optic strands 28 extend from the LED's outward, to convey the light to the outer extremities of the tree. Alternatively, the tree could be configured to use the same or a lesser member of LED's located nearer the base 14, with longer strands of fiber optic cable being used to transmit the light. This would result in a tree utilizing relatively more fiber optic strands and relatively less computer cable, and is a matter of choice in design of the tree.

Figures 7, 8, 9:
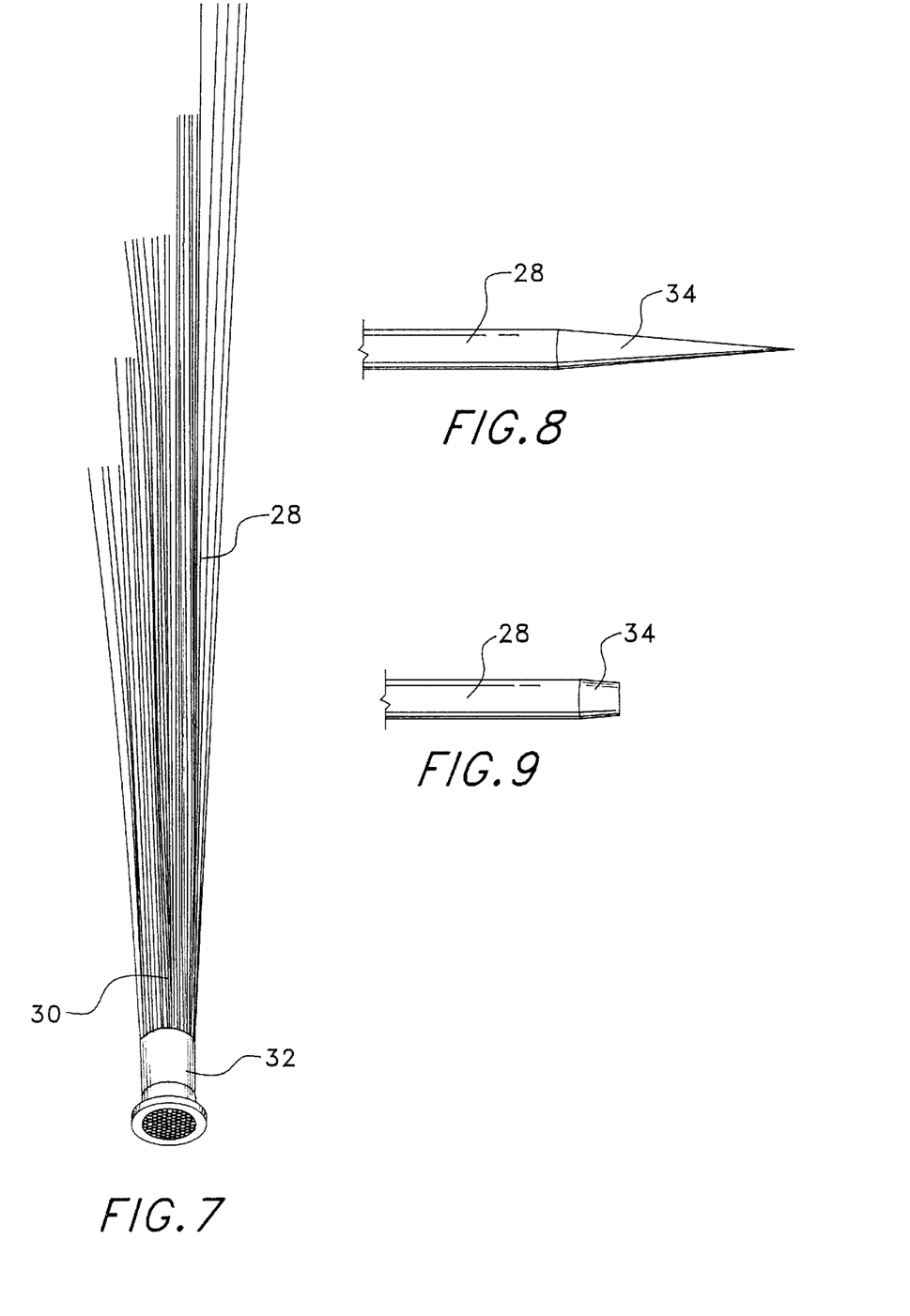
FIG. 7 is a close-up view of an assembly of fiber optic strands.
FIG. 8 is an enlarged view showing one optional shape for the tips and of fiber optic strands.
FIG. 9 is an enlarged view showing an additional optional shape for the tips of the fiber optic strands.
Figure 10:
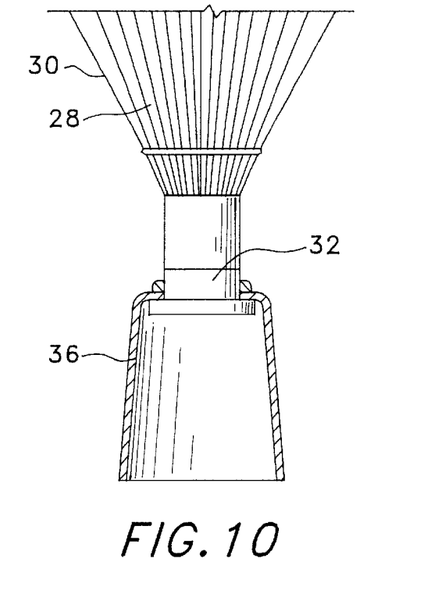
FIG. 10 is a side elevational view of the fiber optic assembly of FIG. 6, with a cross-sectional view of a diffuser attached to the base of the fiber optic assembly.
Figure 11:
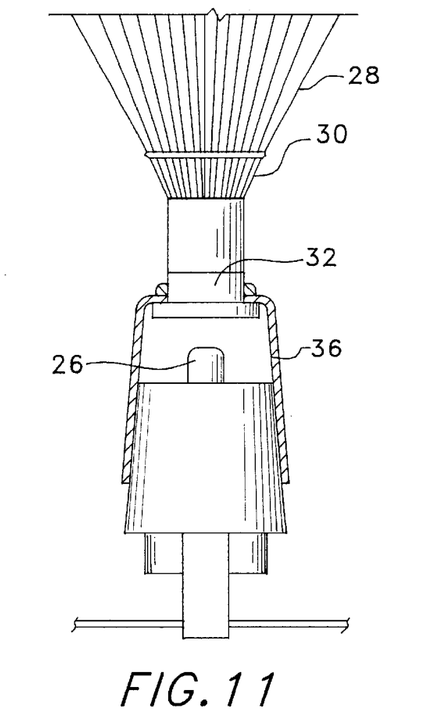
FIG. 11 is a side elevational view of the assembly of FIG. 9, with an LED shown in position in the diffuser.

Referring now to FIGS. 7–12, an assembly 30 of fiber optic strands 28 is shown. The strands are bound together into cluster with ferrule 32 for best operation, and are optimally cut to different lengths in order to provide a more varied and appealing pattern of light display. As best seen in FIGS. 8 and 9, the tips 34 of the fiber optic strands 28 may be cut in a variety of ways to further enhance the effect of the display. For example, cutting the tips 34 to a sharp point as shown in FIG. 8 will result in a more diffused light emanating from the tip 34. On the other hand, cutting the tip 34 in a more flat shape as shown in FIG. 9 will result in a brighter, sharper light. As seen in FIG. 11, light diffuser 36 is affixed to the ferrule 32, and an LED 26 is positioned within the light diffuser. In this way, light from the LED 26 is captured and diffused into the fiber optic strands 28 to create a brighter and more attractive light display.

Figure 5:
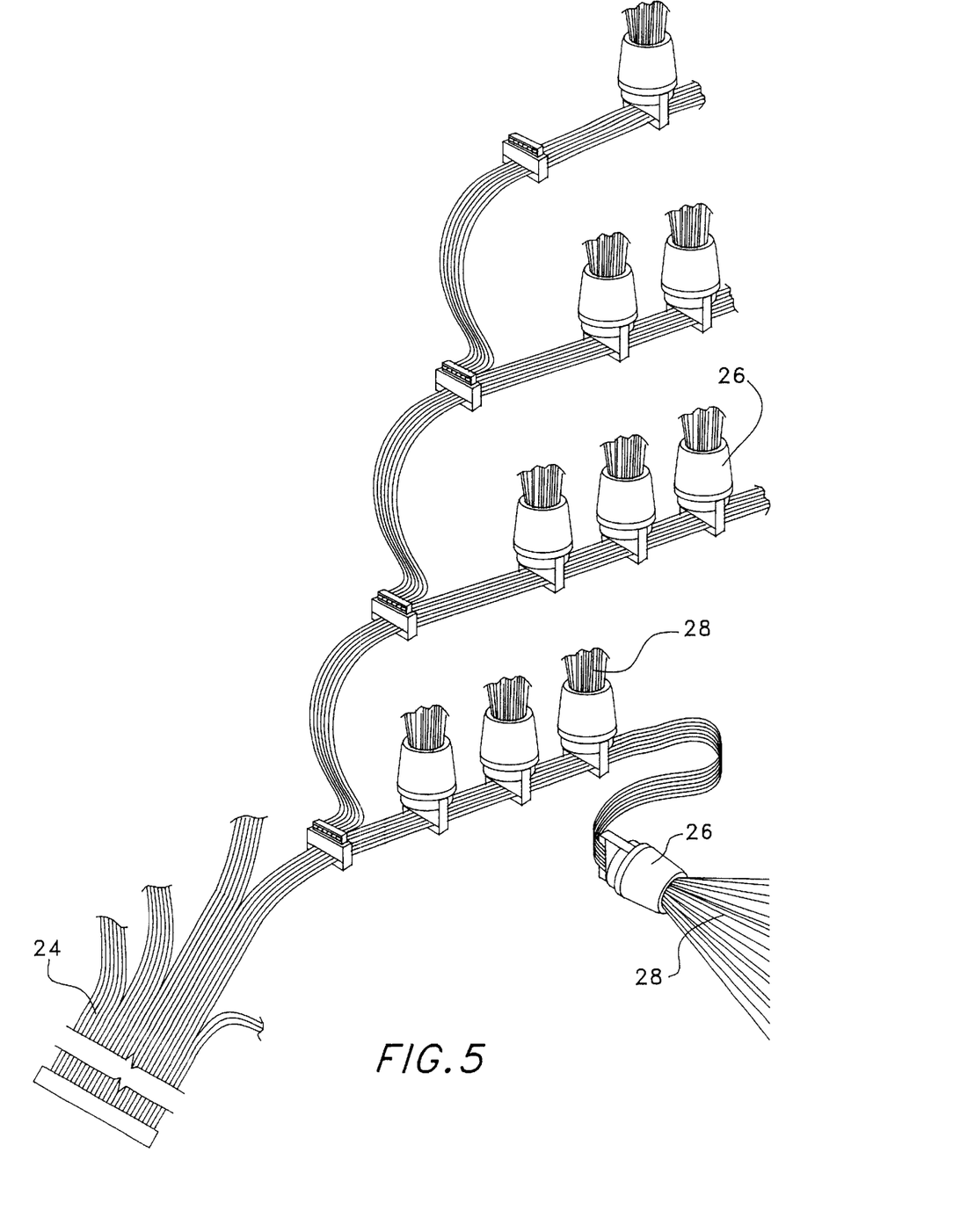
FIG. 5 is an isolated view of the wiring of a tree, showing multiple LED's and fiber optics.
Figure 6:
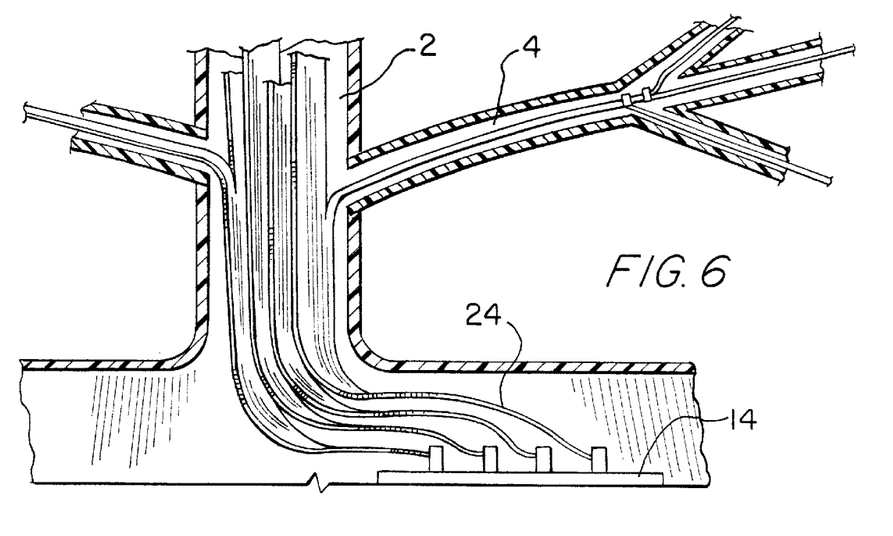
FIG. 6 is a cross-sectional view of the base and lower branches of the tree, depicting the wiring of those areas.
Figure 12:
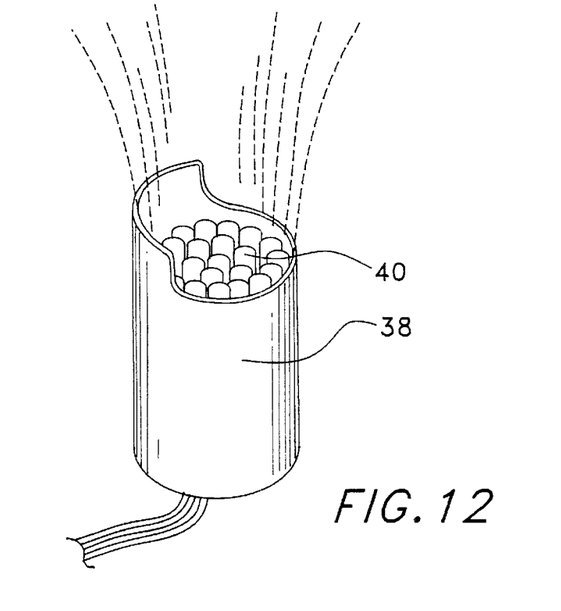
FIG. 12 is a perspective view of an optional LED cluster.

Two different types of LED's may be used to provide the light for the display. The LED 26 of FIGS. 4,5 and 11 is a red-green-blue LED, commonly called an "RGB" LED. This type of LED is capable of selectively producing red, green, or blue light, and is therefore quite convenient to use. However, it is more expensive than LED's which produce only one color of light, and is also not capable of producing a maximum brightness level comparable to that of a single-color LED. An alternative to the RGB LED is shown in FIG. 12. A cluster 38 of single colored LED's 40 may be used in place of RGB LED 26 to provide the light for the display. The choice of which type of LED's to use will depend on the desired objectives associated with any given light display.

Figure 13:
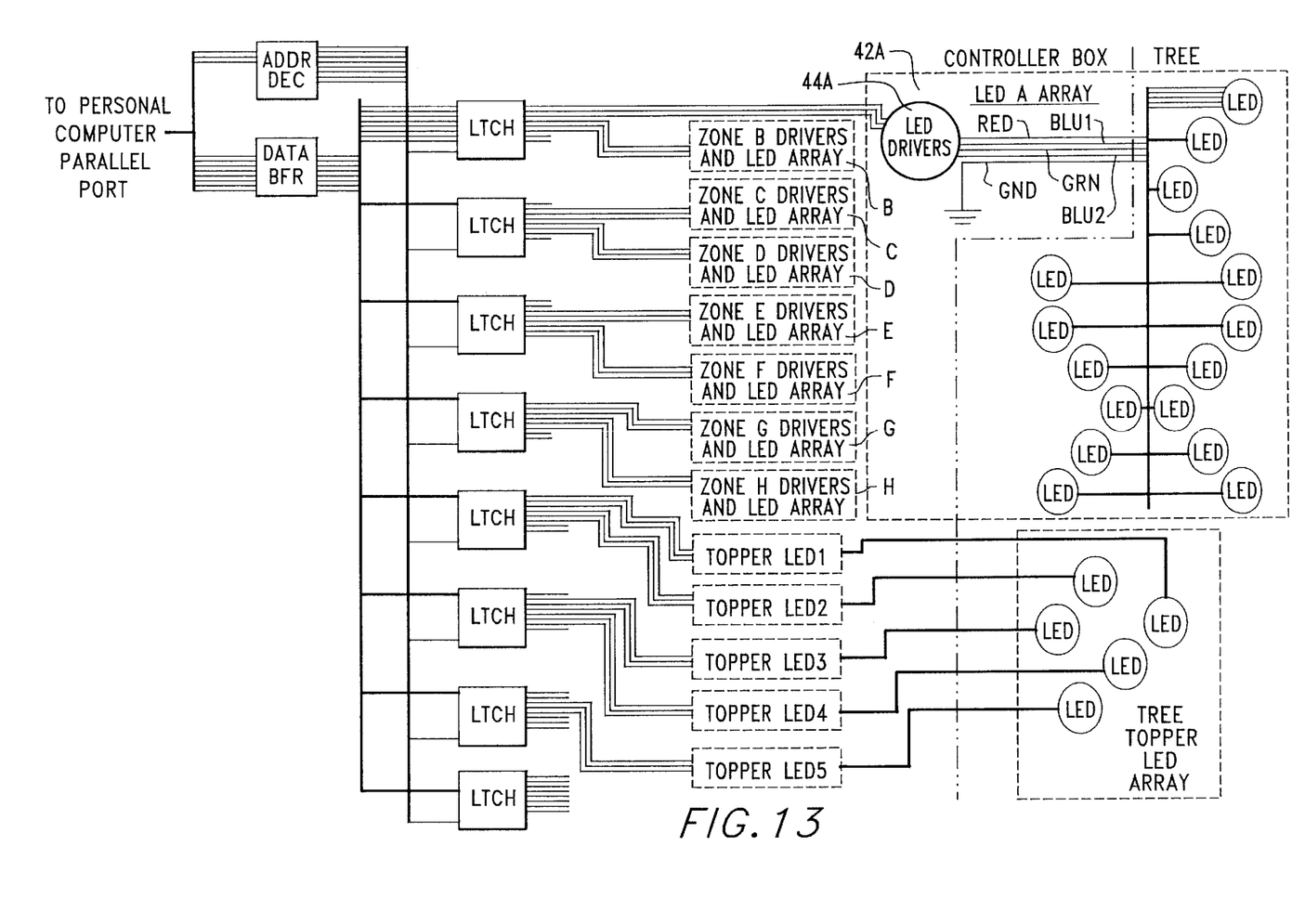
FIG. 13 is a schematic diagram of one arrangement of the wiring and control aspects of a tree according to the invention.
Figure 14:
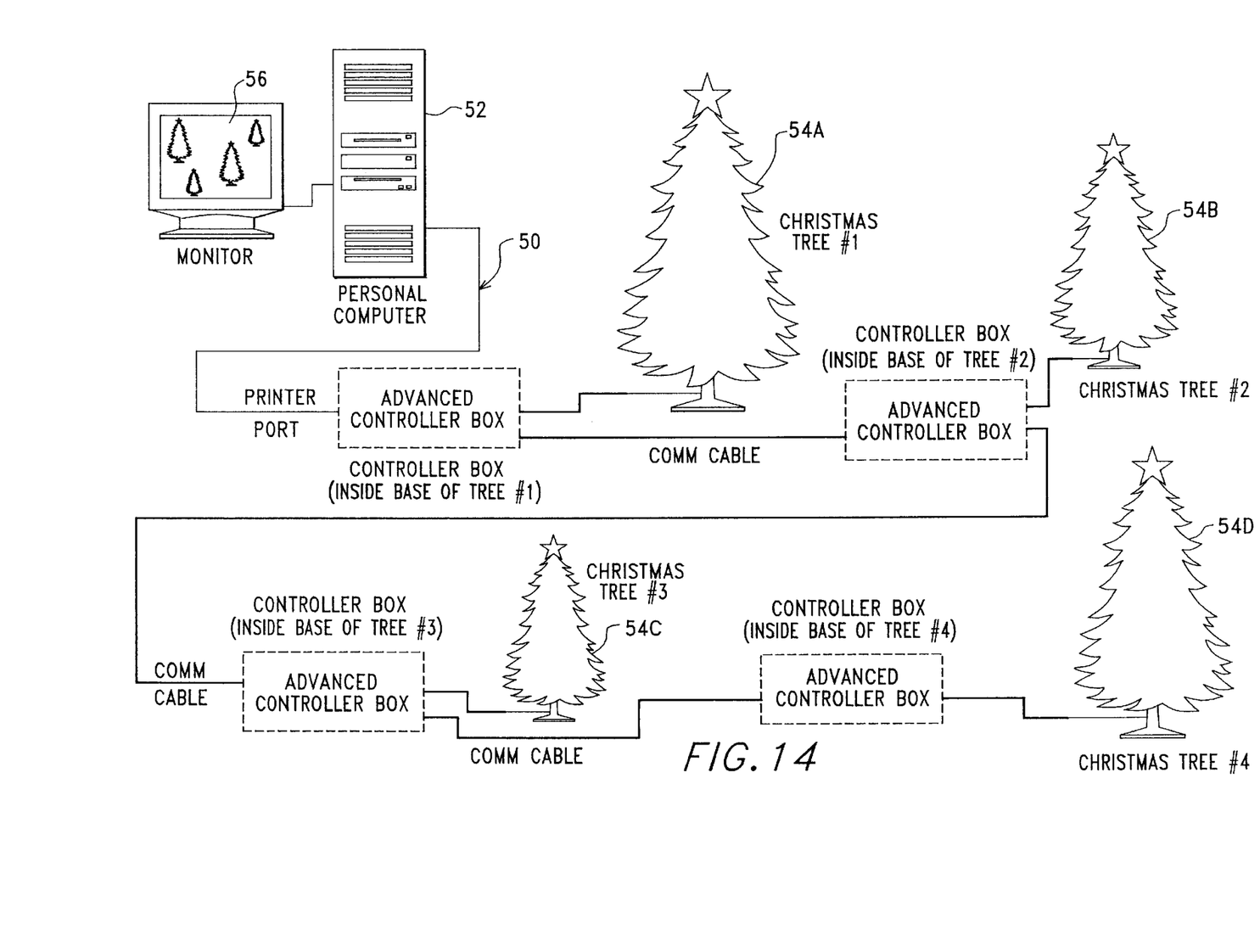
FIG. 14 is a schematic diagram of a multiple-tree array of the invention.

Referring now to FIGS. 13 and 14, the wiring and control aspects associated with a Christmas tree light display are shown. As best seen in FIG. 13, control of the Led's 26 by a computer is typically accomplished by the use of zones 42A–H. Each zone has its own drivers for controlling LED's in that zone. For example, LED's 26 in zone 42A are controlled by drivers 44A. Therefore, all the LED's 26 in zone A will be activated in the same way at the same time. For example, the zone A LED's may all be flashing red, or they may be steady blue, or they may be off, and so on, with each of the LED's acting exactly as the other LED's in the same zone. Similarly, all the LED's in zone B will be acting simultaneously in concert with one another, and so on for each zone. By selectively designing the individual zones to act in a certain way, an aesthetically pleasing sequence of light patterns called a "routine", may be produced.

Turning now to FIG. 14, there is shown a multiple tree array 50 controlled by a single central computer 52. Each of the trees 54 A–D is connected to the personal computer 52, and the entire array, or selected trees from the array, may be viewed on a monitor 56. The trees 54 A–D may be controlled individually, and may be selectively directed to perform any desired routine. This multiple tree array 50 illustrates a level of sophistication not possible with currently used tree displays. Virtually any number of trees could be fit into such an array, with the only limitations being the capacity of the computer and the wiring involved.

Figure 15:
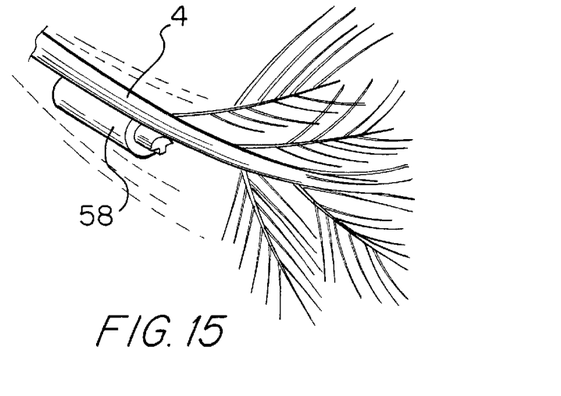
FIG. 15 is an isolated perspective view of a tree shaker positioned on a branch of a tree.
Figure 16:
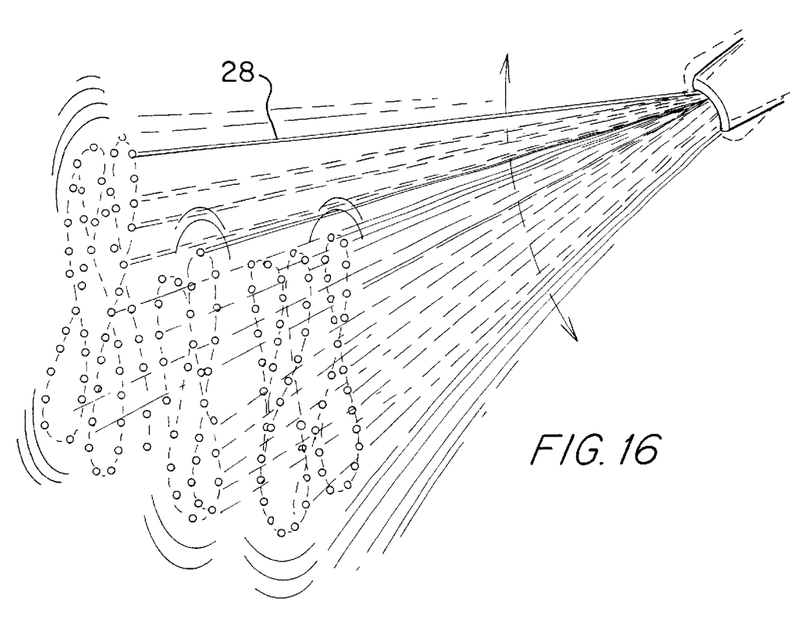
FIG. 16 is a time-exposed view of a tree branch being shaken.
Figure 17:
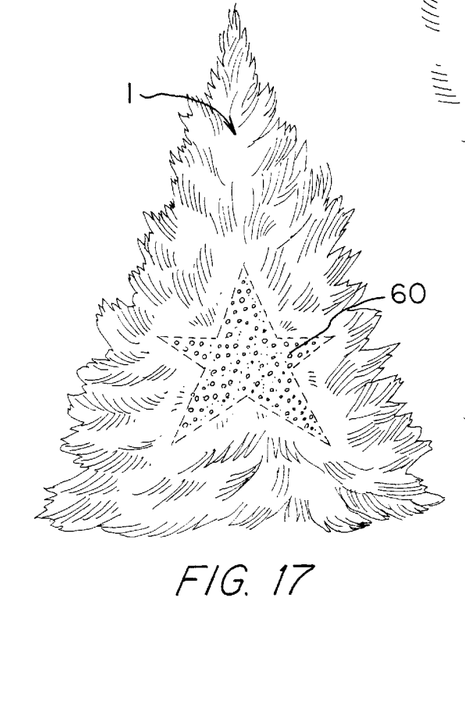
FIG. 17 is a perspective view of a particular image created in a Christmas tree of the present invention.
Figure 18:
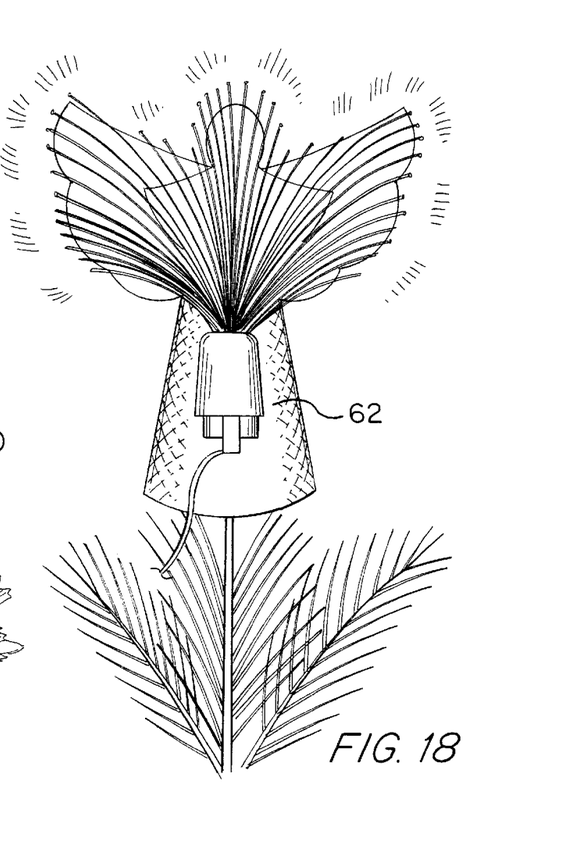
FIG. 18 is a side elevational view of a Christmas tree ornament of the present invention.
Figure 19:
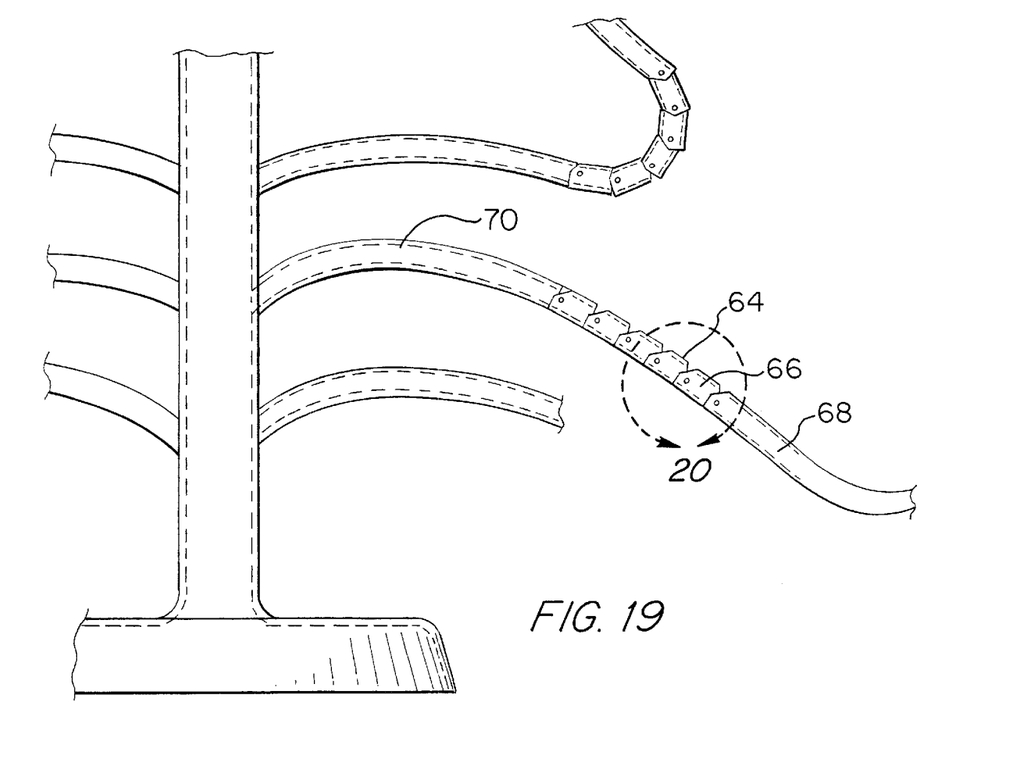
FIG. 19 is a side elevational view of the base and lower branches of the tree showing the use of vertebrate branches.
Figure 20:
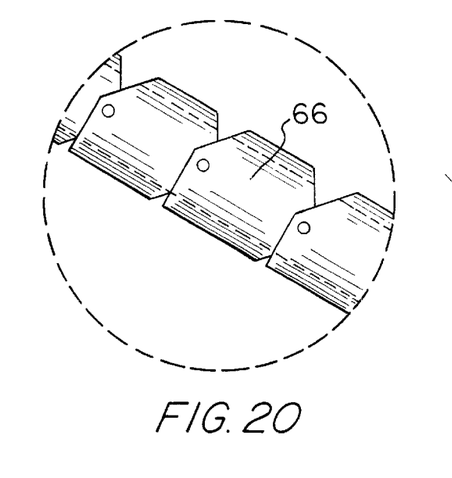
FIG. 20 is an enlarged isolated view of several of the vertebrae of FIG. 18.

Referring now to FIGS. 15–18, several optional features associated with a Christmas tree light display are shown. As seen in FIG. 15, a tree shaker 58 may be attached to a branch or branches 4 of a tree, to shake the branches and thereby to provide an appearance of a tree blowing in the wind. FIG. 16 depicts the effect of a lighted tree branch 4 being shaken. As seen in FIG. 17, any number of various images may be created directly in the Christmas tree 1 itself by simply directing certain LED's to light in a selected pattern. For example, a star 60 may be created as shown. Additionally, tree ornaments such as angel ornament 62 may be created, utilizing the same LED-fiber optic combination as was used to create the Christmas tree 1.

Figures 21, 22:
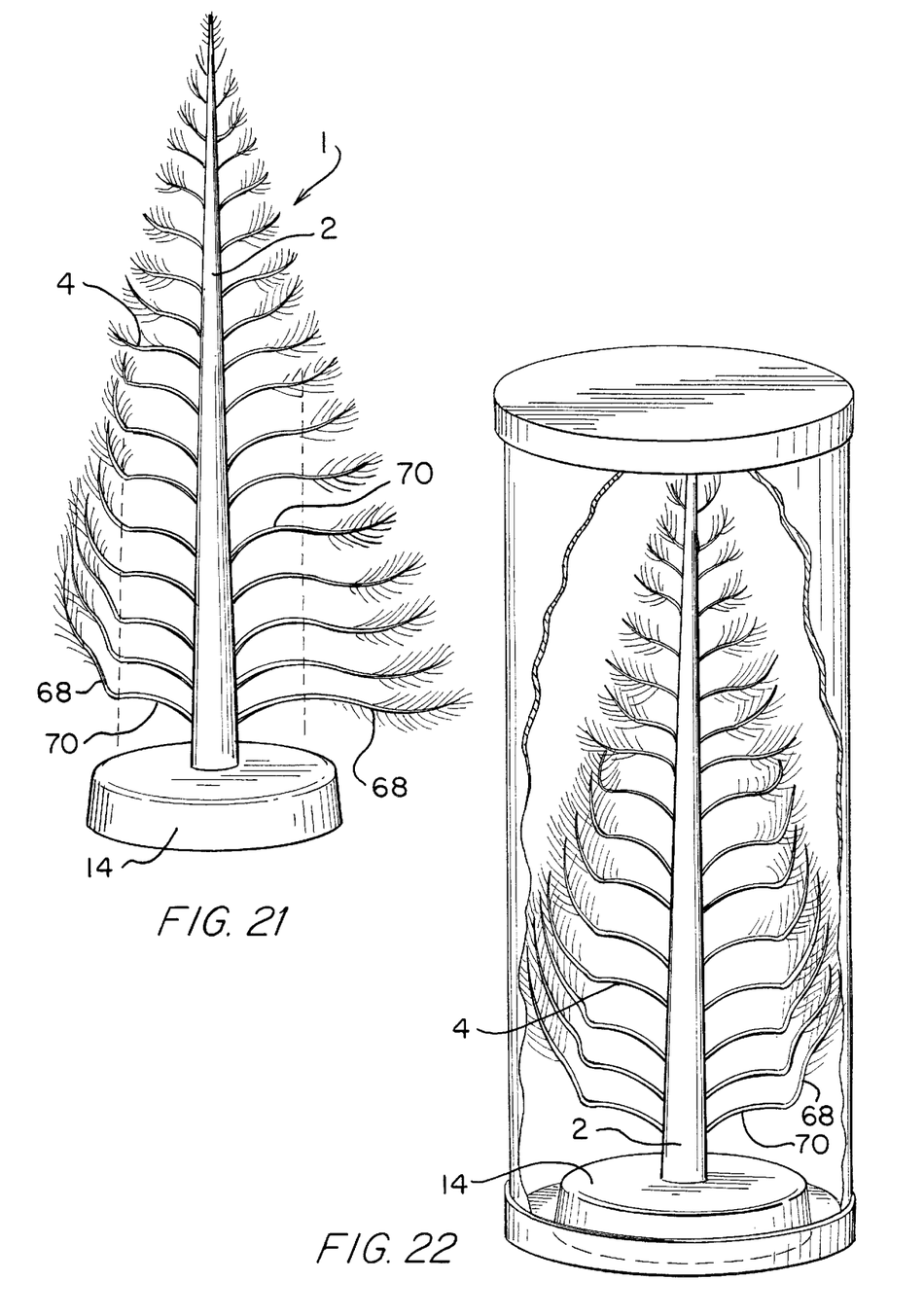
FIG. 21 is a perspective view of a tree showing the position of the vertebrate branches on the tree.
FIG. 22 is a partially cut-away view of a tree packaged in a container.

Referring now to FIGS. 19–22, optional vertebrate branches 64 may be utilized to make the tree easier to store and to ship. The vertebrate branches 64 utilize at least one and preferably a series of such vertebrae. The vertebrae 66 are one-way hinging segments which allow the branch to bend only upwards. For best results, the vertebrae 66 are located on the distal portion 68 of the branch 4, rather than the proximal portion 70. In this way, the distal portion 68 of the branches 4 may be folded upwards for ease of storage, as depicted in FIGS. 21 and 22.

This invention has been described in detail with reference to a particular embodiment thereof, but it will be understood that various other modifications can be effected within the spirit and scope of this invention.

What is claimed is:

1. An interactive light display, comprising:
   multiple LED's selectively arranged to provide a light display, each of said LED's being capable of a plurality of activation states, at least one of said LED's having the capability to selectively display any of the colors red, green, and blue;
   multiple fiber optic strands, each having one end near one of said LED's and extending away from said LED;
   means for controlling the activation state of each of said LED'S; and
   means for connecting each of said LED's to said controlling means such that the activation states of all the LED's may be controlled to form selected light patterns.

2. An interactive light display as claimed in claim 1, wherein:
   said controlling means includes microprocessor circuitry.

3. An interactive light display as claimed in claim 1, wherein:
   said controlling means is a computer.

4. An interactive light display in the form of a Christmas tree having a trunk and branches extending laterally therefrom, comprising:
   multiple LED's selectively arranged on said tree to provide a light display, each of said LED's being capable of a plurality of activation states, at least one of said LED's having the capability to selectively display any of the colors red, green, and blue;
   multiple fiber optic strands, each having a proximal end near one of said LED's and extending away from said LED's;
   means for controlling the activation state of each of said LED'S; and
   means for connecting each of said LED's to said controlling means such that the activation states of all the LED's may be controlled to form selected light patterns.

5. An interactive light display as claimed in claim 4, wherein:
   said controlling means includes microprocessor circuitry.

6. An interactive light display as claimed in claim 4, wherein:
   said controlling means is a computer.

7. An interactive light display as claimed in claim 4, wherein:
   each of said branches includes a proximal portion connected to said tree trunk, said branch extending away from said trunk to a distal portion of said branch; and further including:
   at least two one-way hinges positioned in spaced relation on said branch such that said distal portion is divided into at least two segments, each segment being capable of hinging only upwards relative to said branch.

8. An interactive light display in the form of a Christmas tree having a base, a trunk, and branches extending laterally from said trunk, comprising:
   multiple LED'S selectively arranged on said tree to provide a light display, each of said LED's being capable of a plurality of activation states, at least one of said LED's being positioned above said base and either (a) on said trunk, or (b) on one of said branches;
   multiple fiber optic strands, each having a proximal end near one of said LED's and extending away from said LED'S;
   means for controlling the activation state of each of said LED's; and
   means for connecting each of said LED's to said controlling means such that the activation states of all the LED's may be controlled to form selected light patterns.

9. An interactive light display as claimed in claim 8, wherein:
   said controlling means includes microprocessor circuitry.

10. An interactive light display as claimed in claim 8, wherein:
    said controlling means is a computer.

11. An interactive light display as claimed in claim 8, wherein:
    each of said branches includes a proximal portion connected to said tree trunk, said branch extending away from said trunk to a distal portion of said branch; and further including:
    at least two one-way hinges positioned in spaced relation on said branch such that said distal portion is divided into at least two segments, each segment being capable of hinging only upwards relative to said branch.

12. An interactive light display as claimed in claim 4, wherein at least one of said LED's is capable of selectively displaying any of the colors red, green, and blue.

13. An interactive light display as claimed in claim 8, wherein at least one of said LED's is capable of selectively displaying any of the colors red, green, and blue.

14. An interactive light display in the form of a Christmas tree having a base, a trunk, and branches extending laterally from said trunk, comprising:
    multiple LED's selectively arranged on said tree to provide a light display, each of said LED's being capable of a plurality of activation states, at least one of said LED's being positioned above said base and either (a) on said trunk, or (b) on one of said branches;

multiple fiber optic strands, each having a proximal end near one of said LED's and extending away from said LED's;

means for controlling the activation state of each of said LED's;

means for connecting each of said LED's to said controlling means such that the activation states of all the LED's may be controlled to form selected light patterns; and wherein at least one of said LED's has the capability to display any of the colors red, green, and blue.

* * * * *